March 23, 1965 C. OSTERTAG 3,174,324
VALVE-ACTUATING MECHANISM
Filed Nov. 6, 1961
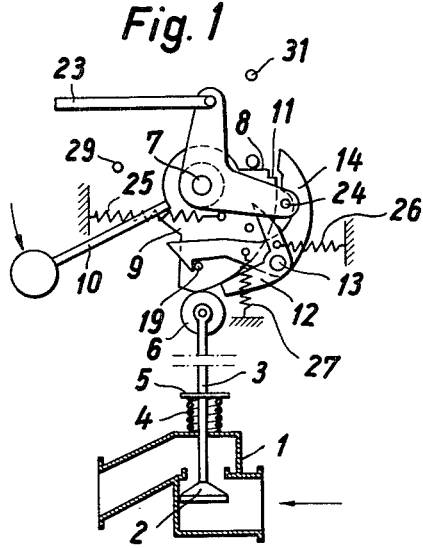
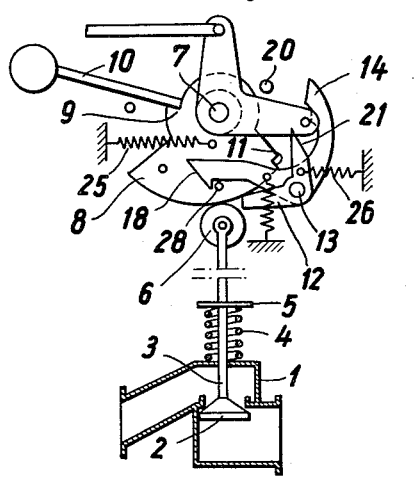
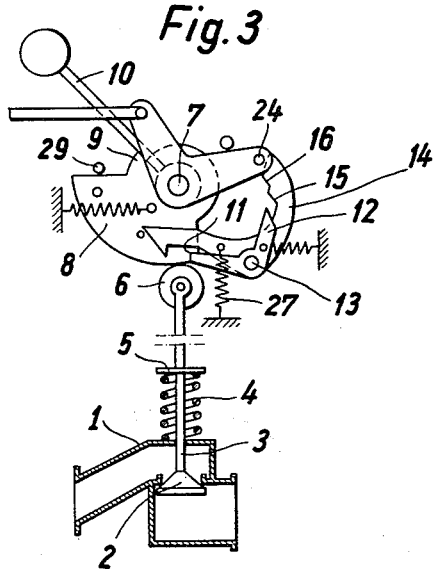
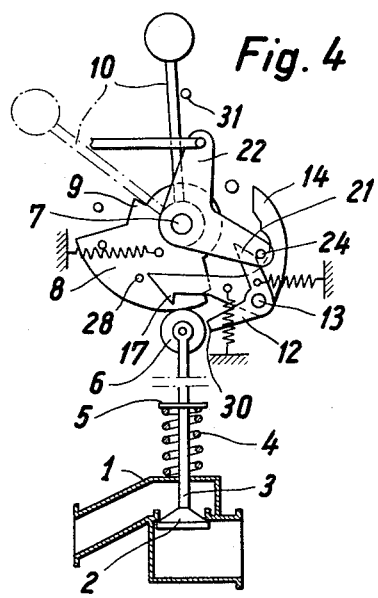
Inventor:
Claus Ostertag
By Stevens, Davis, Miller & Mosher
Attorneys 3,174,324
VALVE-ACTUATING MECHANISM
Claus Ostertag, Mannheim-Waldhof, Germany, assignor to Bopp & Reuther G.m.b.H., Mannheim-Waldhof, Germany
Filed Nov. 6, 1961, Ser. No. 150,395
Claims priority, application Germany, Jan. 18, 1961, B 60,881
4 Claims. (Cl. 74—2)

The subject matter of the invention is an improvement in the valve-actuating mechanism in flow control devices. Known spring-loaded valves used in such devices are opened by hand and throttled and shut off in stages by the action of a mechanical device. They have the disadvantage that the reactive forces from the valve are applied directly to the device, thus necessarily producing very heavy loading of the latter, since the valve stem is directly connected with the flow control device in order to control the position of the valve.

The known constructions are improved on by the present invention in which the valve, which is separated from the flow control device, is controlled by a cam plate which is adjustable for various valve positions by means of a locking device. The locking device takes up, through the cam plate, the bias of the valve as it throttles and closes. Thus the flow control device need only provide enough force as is necvessary to opperate the locking mechanism.

Further advantages and features of the invention will be found in the description and accompanying drawings. The latter illustrates a flow control valve in various operating positions.

In the drawings:

FIG. 1 shows the valve in its fully open position;

FIG. 2 shows the valve in a partially open or throttling position;

FIG. 3 shows the valve in the closed position, and

FIG. 4 shows the valve also in the closed position but with the flow control device in readiness for the next cycle.

The valve 1 includes a valve head 2 attached to the end of its stem 3. The stem 3, and therefore the valve head 2, is biassed a spring 4 acting on a plate 5 secured to the stem 3. The other end of the stem 3 carries a roller 6, which engages a cam plate 8 pivotable about a spindle 7.

The cam plate 8 has a shoulder 9, against which a hand-lever 10 is arranged to abut when the cam plate 8 is to be brought into the appropriate position, the valve 1 being positioned by sliding of the roller 6 on the cam plate. A recess 11 in the cam plate 8 serves to accommodate one end of a two-armed lever 12 when the valve reaches the closed position. This two-armed lever 12 is pivotable about a spindle 13 and is biassed into contact with the cam plate 8 by a spring 26. A further double lever 14 is also rotatably mounted on the spindle 13. This double lever 14 has two abutment surfaces 15 and 16 (FIG. 3) on one arm, whereas the other arm has a pawl 17 (FIG. 4) the back of which is provided with a cam surface 18. In the open position of the valve the pawl 17 engages a pin 19 extending from the cam plate, the lever 14 being biassed into this position by a spring 27. A further stop 20 (FIG. 2) serves to limit rotary movement of the cam plate 8 in the anti-clockwise direction.

Attached to the spindle 7 is a double lever 22, one arm of which is pivotally connected at one end to a tension rod 23. The other arm of the double lever 22 carries at its end a roller or a pin 24 for co-operation with the abutment surfaces 15 and 16 of the double lever 14. A spring 25 acts to keep the cam plate 8 biassed and to return it to the original position on release.

The open position of the valve shown in FIG. 1 is reached when the hand lever 10 is turned in the direction of the arrow and the cam plate 8 is rotated by means of the shoulder 9 so that the roller 6, and therewith the valve stem 3, is depressed downwardly against the force of the valve spring 4. During this valve opening process, the double lever 14 overcomes the force of the spring 27 and rotates under the action of the pin 19 sliding along the cam surface 18 until the pin 19 is engaged behind the pawl 17. The lever 14 thus holds the cam plate 8 by means of its pawl 17.

Shortly before reaching the quantity pre-set by the quantity adjusting mechanism (not shown) of the counter, the head 2 of the valve is automatically moved to the throttling stage shown in FIG. 2, by pivoting the double lever 22 about its spindle by means of the tension rod 23. This pivotal movement of the double lever 22 is counter-clockwise but is a limited movement. During this movement the lever 22, by means of the pin or roller 24 on its other arm, moves the pawl 17 upwardly by camming the roller 24 against the surface 15 against the force of the tension spring 27, thereby releasing the stop 19 and with it the cam plate 8. The spring 25 thereafter turns the cam plate 8 clockwise until the pawl 17 abuts against the pin 28 arranged on the cam plate 8. Under the influence of the valve spring 4 the roller 6 runs down the cam of the plate 8 and so moves upwardly. The stem 3, and with it the valve head, is thereby raised until the throttling position is reached.

As a result of the sharply decreased flow the first numeral cylinder in the flow control device turns only very slowly. As soon as the zero appears on the dial, indicating that the whole of the set quantity has been discharged, a movement is produced through the rod 23 and lever 22 in the same way as for throttling. The lever 22 moves the pawl 17 upwardly by means of the roller 24 camming on the surface 16 on the double lever 14, whereby the pin 28 is released and the cam plate 8 can turn on clockwise under its spring bias until it comes into contact with an abutment 29. The roller 6 following the cam plate allows the valve stem 3 with the head 2 to rise until the closed position is reached and the flow thereby interrupted. In the meantime the detent end of one arm of the double lever 12 falls into the recess 11 (FIG. 3) to lock the cam plate. Thus the valve is prevented from opening without the flow control device first being switched on.

When a measuring cycle has been completed the flow control device must be returned to the ready position for further use. This is effected by raising the hand lever 10 from the position shown in dotted lines in FIG. 4 until it is halted by an abutment 31 during which rotary movement the lever 22 is moved clockwise. This produces the result that because the tension rod 23 and the double lever 22 are pivotally connected together, the rod is moved. In this way the flow control device is switched on by means of the rod 23. Further, the roller 24 on the other arm of the double lever 22 slides downwardly over the abutment surfaces 16 and 15, whereby the pawl 17 of the two-armed lever 14 also moves downwardly and comes to rest with its cam surface 18 in front of the pins 28 and 19. The pin 24 further presses against the double lever 12 at 21, thereby unhooking its pawl 30 from the recess 11 in the cam plate. By turning the hand lever 10 the valve can now be moved into the position shown in FIG. 1.

At the opening of the valve the cam plate 8 turns anti-clockwise. The roller 6 with the stem 3 and the valve head 2 are downwardly displaced and the flow is thus restarted. At the same time the pawl 17 is raised in succession by the pins 28 and 19 until the pin 19 lies behind the pawl 17 and thus secures the position of the valve head 2.

I claim:
1. An actuating mechanism for a spring closed valve for quantity adjustment mechanisms of the type having a reciprocating valve stem comprising a valve body through which said stem extends, cam means pivotally connected adjacent the end of the stem, means on the end of the stem adjacent said cam means for engaging said cam means, double arm lever means pivotally disposed adjacent said cam means, said cam means being provided with at least two position-determining elements corresponding respectively to the open and a partially-open position of the valve, one arm of said double arm lever means engaging said elements to maintain the cam means respectively in the said open and partially-open positions, locking means disposed adjacent said cam means to lock said cam means in a position corresponding to the closed position of the valve, first operating means engageable with an abutment on said cam means to rotate said cam means and second operating means engageable with said double arm lever means to release said cam for movement to adjust said valve position, the first operating means being further arranged to move said second operating means so that it engages the locking means and causes the latter to release the cam means, and the first operating means being arranged for engagement with the said abutment and upon release of said locking means to cause said cam means to be rotated in one direction thereby moving the valve stem from the said closed to the said open position.

2. An actuating mechanism for a spring closed valve for quantity adjustment mechanisms of the type having a reciprocating valve stem comprising a valve body through which said stem extends, a roller on the end of said stem, cam means pivotally connected adjacent the end of the stem and engaging said roller, said cam means being provided with at least two stop elements so positioned on said cam so as to maintain said valve in an open or a partially-open position, a first two-arm lever means pivotally disposed adjacent said cam means, one arm of said first two-arm lever means being engageable with said elements, a second two-arm lever pivotally connected adjacent said cam means, one arm of said second lever engaging a recess in said cam means to lock said cam means in a position corresponding to the closed position of the valve, first operating means engageable with an abutment on said cam means to rotate said cam means and second operating means engageable with said first two-arm lever means to release said cam for movement to adjust the valve position, first operating means being further arranged to move the said second operating means so that it engages the second two-arm lever means and causes the latter to unlock the cam means, and the first operating means being arranged for engagement with the said abutment and upon the unlocking of the said cam means to cause the latter to be rotated in one direction thereby moving the valve stem from the said closed to the said open position.

3. An actuating mechanism for a spring closed valve for quantity adjustment mechanisms of the type having a reciprocating valve stem comprising a valve body through which said stem extends, a roller positioned on the end of said stem, pivotal cam means mounted adjacent the end of the stem and engaging said roller, said cam means being provided with at least two stop elements so arranged on said cam means as to hold said cam means in a position to maintain said valve in an open or a partially-open position of the valve, a first two-arm lever means pivotally mounted adjacent to said cam means, one arm of said first lever means bearing means to selectively engage one of said elements to maintain the said valve in the said open or partially-open positions, a second two-arm lever means pivotally connected adjacent said cam means, one arm of said second lever means engaging a recess in said cam means to lock said cam means in a position which maintains the valve in the closed position, first operating means pivotally mounted on the same shaft carrying said cam means and engageable with an abutment on said cam means and second operating means engageable with cam sections on the other arm of said first lever means to release said one arm of said first lever means from engagement with said stop elements, said first operating means being arranged to move said second operating means so that it moves the other arm of the second lever means toward said cam means and pivots the one arm out of the said recess to unlock the cam means and the first operating means being arranged for engagement with the said abutment and upon the unlocking of the said cam means to cause the latter to be rotated in a counter-clockwise direction thereby moving the valve stem from the said closed to the said open position.

4. An actuating mechanism for a spring closed valve for quantity adjustment mechanisms of the type having a reciprocating, spring biased valve stem comprising a valve body through which said stem extends, a roller positioned on the end of said stem, pivotal cam means mounted on a shaft adjacent the end of the stem and engaging said roller, at least two stop elements on said cam, the first element positioned to hold the cam so the valve is open, the second element positioned to hold the cam so the valve is partially closed, a first L-shaped lever means pivotally mounted adjacent said cam means, one arm of said first lever means bearing a pawl to alternately engage said first and second stop elements, the second arm of said first lever means having two cam sections on the side facing said cam means, biasing means connected to said second arm to position said lever means to be engageable with said stop elements, a second L-shaped lever means pivotally mounted adjacent said cam means, one arm of said second lever means engaging a recess in said cam means to lock said cam means in position when said valve is closed, a hand-lever pivotally mounted on said cam mounting shaft and engageable with an abutment on said cam means, a third L-shaped lever pivotally mounted on said shaft, one arm of said third lever being connected to a flow control device, the second arm of said third lever bearing a roller engageable with said cam sections on said first lever, said third lever being arranged for clockwise movement by said hand lever to move the second arm of said third lever into engagement with the second arm of said second lever to pivot said first arm of said second lever from the recess in said cam means to unlock same, said hand lever being arranged to engage said abutment on said cam section upon the unlocking of the said cam means so as to rotate said cam means counter-clockwise thereby moving the valve stem to the said open position from the said closed position.

References Cited in the file of this patent

UNITED STATES PATENTS

| | | |
|---|---|---|
| 1,113,314 | Dale | Oct. 13, 1914 |
| 1,995,634 | Clarke | Mar. 26, 1935 |
| 2,258,811 | Ray | Oct. 14, 1941 |
| 2,302,637 | McCormick et al. | Nov. 17, 1942 |
| 2,375,642 | Gayer | May 8, 1945 |
| 2,393,091 | De Lacy-Mulhall | Jan. 15, 1946 |
| 2,875,617 | Murphy | Mar. 3, 1959 |
| 2,991,658 | Haessler et al. | July 11, 1961 |

FOREIGN PATENTS

| | | |
|---|---|---|
| 447,802 | Italy | May 2, 1949 |